(12) United States Patent
Saecker

(10) Patent No.: US 10,393,593 B2
(45) Date of Patent: Aug. 27, 2019

(54) MEASURING ARRANGEMENT COMPRISING FIRST AND SECOND PAIRS OF THERMOWIRES

(71) Applicant: Endress + Hauser Wetzer GmbH + Co. KG, Nesselwang (DE)

(72) Inventor: Dietmar Saecker, Fussen (DE)

(73) Assignee: ENDRESS + HAUSER WETZER GMBH + CO. KG, Nesselwang (DE)

( * ) Notice: Subject to any disclaimer, the term of this patent is extended or adjusted under 35 U.S.C. 154(b) by 171 days.

(21) Appl. No.: 15/523,750

(22) PCT Filed: Sep. 17, 2015

(86) PCT No.: PCT/EP2015/071291
§ 371 (c)(1),
(2) Date: May 2, 2017

(87) PCT Pub. No.: WO2016/071032
PCT Pub. Date: May 12, 2016

(65) Prior Publication Data
US 2017/0350766 A1    Dec. 7, 2017

(30) Foreign Application Priority Data
Nov. 4, 2014   (DE) .................. 10 2014 116 051

(51) Int. Cl.
*G01K 7/02* (2006.01)
*G01K 7/06* (2006.01)
*G01K 15/00* (2006.01)
*G01K 13/00* (2006.01)

(52) U.S. Cl.
CPC ............... *G01K 7/021* (2013.01); *G01K 7/06* (2013.01); *G01K 13/00* (2013.01); *G01K 15/007* (2013.01)

(58) Field of Classification Search
CPC ............ G01K 7/02; G01K 13/02; G01K 7/06; G01K 13/00; G01K 2217/00
USPC .................. 374/179, 163, 208, 185; 136/200
See application file for complete search history.

(56) References Cited

U.S. PATENT DOCUMENTS

| 3,417,618 | A | * | 12/1968 | Morrisette | ............ G01K 7/021 |
| | | | | | 136/230 |
| 3,477,880 | A | * | 11/1969 | Gay | ..................... G01R 19/225 |
| | | | | | 136/207 |
| 4,718,777 | A | * | 1/1988 | Mydynski | ................ G01K 7/12 |
| | | | | | 374/181 |

(Continued)

FOREIGN PATENT DOCUMENTS

| DE | 3803270 A1 | 8/1989 |
| DE | 19945205 A1 | 3/2001 |

(Continued)

OTHER PUBLICATIONS

German Search Report, German Patent Office, Munich, DE, dated Jul. 30, 2015.

(Continued)

*Primary Examiner* — Gail Kaplan Verbitsky
(74) *Attorney, Agent, or Firm* — Bacon & Thomas, PLLC

(57) ABSTRACT

A measuring arrangement comprising a first pair of thermowires wherein the two thermowires of the first pair are insulated completely from one another by an insulation, such as, for example, a material, which serves for electrical insulation between the two thermowires of the first pair.

24 Claims, 4 Drawing Sheets

(56) References Cited

U.S. PATENT DOCUMENTS

| | | | | |
|---|---|---|---|---|
| 5,038,303 | A | * | 8/1991 | Kimura .................... G01K 7/02 324/105 |
| 5,611,624 | A | * | 3/1997 | Tornare ............... F02D 41/1446 374/142 |
| RE35,674 | E | * | 12/1997 | Pustell ..................... G01K 1/18 136/230 |
| 6,344,747 | B1 | | 2/2002 | Lunghofer et al. |
| 6,425,687 | B1 | * | 7/2002 | Kulczyk .................. G01K 3/06 374/115 |
| 7,753,584 | B2 | * | 7/2010 | Gambino ................. G01K 7/04 136/225 |
| 7,862,231 | B2 | * | 1/2011 | Liu .......................... G01K 7/12 374/137 |
| 7,994,416 | B2 | * | 8/2011 | Schuh ...................... G01K 7/13 136/224 |
| 8,608,377 | B2 | * | 12/2013 | Conti ....................... G01K 7/10 374/179 |
| 2009/0306839 | A1 | * | 12/2009 | Youngquist ............ G01K 7/021 701/14 |
| 2012/0065923 | A1 | * | 3/2012 | Whiteley ............... G01K 7/023 702/130 |
| 2014/0269821 | A1 | * | 9/2014 | Egley ..................... G01K 1/026 374/54 |
| 2019/0086273 | A1 | * | 3/2019 | Yamana ................... G01K 7/06 |

FOREIGN PATENT DOCUMENTS

| | | |
|---|---|---|
| DE | 102014116051 A1 | 5/2016 |
| GB | 2183909 A | 6/1987 |
| JP | H1048061 A | 2/1998 |
| JP | H10232170 A | 9/1998 |
| JP | H10232171 A | 9/1998 |
| JP | 2010256166 A | 11/2010 |
| JP | 3177887 U | 8/2012 |
| WO | 88/02106 A1 | 3/1988 |
| WO | 01/06474 A1 | 1/2001 |

OTHER PUBLICATIONS

International Search Report, EPO, The Netherlands, dated Nov. 23, 2015.

English Translation of the International Preliminary Report on Patentability, WIPO, Geneva, CH, dated May 29, 2017.

\* cited by examiner

MEASURING ARRANGEMENT COMPRISING FIRST AND SECOND PAIRS OF THERMOWIRES

TECHNICAL FIELD

The invention relates to a measuring arrangement and to a method for operating a measuring arrangement.

BACKGROUND DISCUSSION

Thermocouples are a type of temperature sensor used in a large number of applications. Usually, a thermocouple is formed of two different elements in the form of thermowires, which are connected with one another at a junction. The principle, on which a thermocouple works, is that a voltage or electromotive force occurs at the junction (referred to as the hot junction) of the two different elements. This junction is, in such case, arranged in the vicinity of a measuring point, whose temperature is to be measured, or at least the junction is in thermal contact therewith.

The thermowires are for reasons of electrical insulation and also for protection against disturbing external influences embedded in a material, which serves for electrical insulation between the thermowires and/or against the environment of the thermowires.

With time, thermocouples can experience changes in composition due to operational loadings. As a result of these changes, the measured thermovoltage no longer corresponds to the actual temperature. Changes in the composition of a thermocouple are referred to, in general, as deterioration. This deterioration can lead to inexact temperature measurements.

Sometimes when a thermocouple has suffered deterioration, an operator of a temperature dependent process, in which the thermocouple is being used, is, in given cases, not able to detect the deterioration. Other times, the operator can figure out from experience that the temperature measurement is outside of a normal temperature range, in which the process is normally operated and so conclude that a deterioration of the thermowires has occurred. Due to aging processes during use, the thermoelectric homogeneity can, however, be greatly lessened (temperature measurement errors of 1 K to 100 K are possible). However, the operator is, in some cases, not able to detect that a thermocouple has weakened, since varied sources of error can be present. Furthermore, the operator is, as a rule, not able to detect the beginning phase of the deterioration of a thermocouple.

Correspondingly, it is known from the state of the art, such as, for example, from U.S. Pat. No. 6,344,747 A1, to compare the resistance of various measuring points with one another for detecting deterioration.

Furthermore, it is known to use particular insulation for protection against substances penetrating from the environment, for example, penetration of a component of the measured material.

In such case, the distance, over which the thermowires are led, is decisive for sensor performance and life. Especially is this true in the case of, for example, mineral insulated thermowires. It should, consequently, be avoided as much as possible that the thermowires extend through hot zones, such as occur, for example, in the vicinity of an oven. The failure to meet these measures concerning the distance, along which the thermowires are led, increases the probability of a defective measurement as a result of a so-called virtual junction error—i.e. a parasitic thermovoltage. Thus, substances from the measured material penetrating into the insulation of the thermowires or to the thermowires or a removal of material, from which the thermowires are composed, can lead to a conductive connection between the thermowires lying not at the junction, i.e. the actual measuring point. This short circuit leads to a corrupted measurement signal, since it provides a (parasitic) voltage, which is superimposed on that, which results from the measuring point. For example, in the case of a burner with a combustion chamber spaced from the heating chamber, it can occur that the thermowires are exposed to higher temperatures along the route to a measuring point in the heating chamber.

SUMMARY OF THE INVENTION

An object of the invention is to enable a more exact measurement and/or more reliable measurement of a temperature, especially in the case of applications in which the temperature of at least one position along the course of the thermowires exceeds the temperature at the junction, or in the case that a deterioration of the thermowires has happened.

The object is achieved by a measuring arrangement and by a method for operating a measuring arrangement.

As regards the measuring arrangement, the object is achieved by a measuring arrangement comprising a first pair of thermowires, wherein the two thermowires of the first pair are completely insulated from one another by an insulation, such as, for example, a material, which serves for electrical insulation between the two thermowires of the first pair.

The measuring arrangement can be a measuring arrangement, which serves primarily for determining temperature, such as, for example, a thermometer.

In order to manufacture a thermocouple, usually two thermoelectrically effective conductors (thermopair) are, for example, electrically (directly) connected with one another at one of their ends to form a junction. It is, however, also known to use an electrical conductor, via which the ends of the thermocouple are (indirectly) connected with one another. At the other end (reference junction) connection lines, for example, copper lines, are provided, which lead to an evaluating circuit, such as, for example, a voltage measuring device. The junction, which is arranged in the region of a desired measuring point, is exposed to the temperature to be measured, while the reference junction is held at a, for example, constant, known reference temperature. The measured thermovoltage corresponds to the temperature difference between the junction (hot junction) and reference junction (cold junction), wherein the thermovoltage level is still dependent on, among other things, the material combination of the thermocouple. In such case, the thermowires must be electrically insulated for protection against contact with one another. The insulating materials influence the upper utilization temperature of the thermocouple (cotton or silk to 120° C., lacquer or silicone rubber to 180° C., synthetic materials, e.g. plastics, to 260° C.). For higher temperatures, protection and insulating tubes, and fiber materials of quartz glass (to 1000° C.) or ceramic (to about 2000° C.) are used.

A first pair of thermowires is provided, which has no junction, thus the wires are not electrically connected with one another, in order to form a junction. For example, two thermowires, which are non-contacting, i.e. separated from one another, and which are insulated from one another by the insulation, can be used. Thus, the first pair of thermowires has no junction. The thermowires can, however, be connected either directly or via connection wires, which are connected with the thermowires, to a reference junction, for example, electrically connected with one another via an evaluating circuit, for example, in order to determine a first (parasitic) voltage, which might be present between the first pair of thermowires. Based on this first voltage, a state of the measuring arrangement and especially deterioration of the thermowires can be detected.

The insulation can be one of the above mentioned materials or material combinations. The two thermowires of the first pair of thermowires are, thus, insulated from one another by these insulations—over the total course of the wires. The thermowires of the first pair are, in such case, at least in the region, in which they are embedded in the insulation, insulated from one another.

In a form of embodiment of the measuring arrangement, the two thermowires of the first pair have, consequently, no junction serving for determining temperature. Preferably, the thermowires are thus not electrically connected with one another, but, instead, have free ends, which are embedded in the insulation.

In an additional form of embodiment of the measuring arrangement, the two thermowires of the first pair serve to register a first thermovoltage, especially a parasitic thermovoltage, for example, as a reference voltage for a second thermovoltage. For example, the thermovoltage present between the first pair of thermowires can be determined. This can be measured, for example, by measuring the line resistances of the first and second thermowires or the insulation resistance between the first and second thermowires forming the first pair of thermowires. This measured resistance, for example, measured by means of an evaluating circuit, can then be compared with one or more threshold values. As a function of this comparison, then a corresponding diagnostic report can be output, which gives the state of the measuring arrangement, as regards deterioration or aging of the used thermowires.

In an additional form of embodiment of the measuring arrangement, the measuring arrangement includes a second pair of thermowires, wherein the two thermowires of the second pair are electrically connected with one another at a junction and serve to provide a second thermovoltage. The second pair of thermowires can thus serve for registering the temperature, while the first pair of thermowires serves for monitoring the measuring arrangement, more exactly the second pair of thermowires. The first and second thermovoltages can additionally be compared with one another.

In an additional form of embodiment of the measuring arrangement, the first pair of thermowires is electrically insulated from the second pair of thermowires. To this end, for example, the same insulation, i.e. the same material, as used for electrical insulation between the thermowires of the first pair of thermowires, can be used.

In an additional form of embodiment of the measuring arrangement, an evaluating circuit is provided, which serves to register the first thermovoltage and the second thermovoltage. For example, the evaluating circuit can be connected, especially alternately, both with the first pair of thermowires and with the second pair of thermowires, in order to determine the first and/or the second thermovoltage.

In an additional form of embodiment of the measuring arrangement, the second pair of thermowires extends along a path, wherein the first pair of thermowires extends along at least one part of this path, preferably to the junction of the second pair of thermowires. The first and second paths extend, in such case, preferably parallel to one another. In this way, the first and second pairs of thermowires are exposed essentially to the same environmental conditions. The two thermopairs are therewith subject to the same environmentally related aging phenomenon and the same deterioration. The path can, in such case, be predetermined by the course of the second pair of thermowires between the evaluating circuit and the junction of the second pair of thermowires.

In an additional form of embodiment of the measuring arrangement, the first and second pairs of thermowires are embedded in an electrically insulating material. In such case, the material can be, for example, a fill material, especially a ceramic fill material, preferably a fire resistant fill material. The first and second pairs of thermowires are, in such case, preferably completely surrounded by this material.

In an additional form of embodiment of the measuring arrangement, the insulating material is surrounded by a shell, preferably a metal shell. The first and/or the second pair are, in such case, likewise arranged in this shell and embedded in the electrically insulating material. The shell forms, in such case, for example, a so-called measuring insert, which is inserted in a protective tube or directly exposed to the measured material whose temperature is to be determined. The first and second pairs of thermowires can, in such case, extend along the length of the shell essentially parallel to one another up to an end of the shell serving as measuring tip.

In an additional form of embodiment of the measuring arrangement, the shell is arranged in a protective tube. The protective tube is, for example, connected with a container conveying the measured material. In such case, the protective tube is so embodied that it can accommodate the shell serving as a measuring insert. For example, the end of the measuring insert serving as measuring tip can come in contact with the floor on the inner side of the protective tube.

In an additional form of embodiment of the measuring arrangement, at least three thermowires are provided, wherein a first and a second of these three thermowires form the first pair, and wherein the first and a third of these three thermowires form the second pair. Thus, a measuring arrangement can be formed, which is composed of three thermowires. In such case, two of these thermowires are electrically connected with one another at a junction, while a third thermowire extends completely insulated from the first and second thermowires. The evaluating circuit can then serve to measure the first thermovoltage between the first and the third thermowire and the second thermovoltage between the first and second thermowires.

In an additional form of embodiment of the measuring arrangement, four thermowires are provided, wherein a first and a second of these four thermowires form the first pair, and a third and a fourth of these four wires form the second pair. The measuring arrangement can, thus, be composed of four thermowires.

In an additional form of embodiment of the measuring arrangement, the first thermovoltage serves to produce a diagnostic report regarding the state of the second pair of thermowires or the state of a measurement signal. In general, the first pair of thermowires can serve to determine or to predict information concerning the effects of a process and the sensors connected therewith, especially on the deterioration of a thermocouple.

In an additional form of embodiment of the measuring arrangement, the first thermovoltage serves for correction of an error contained in the second thermovoltage, which error rests especially on the presence of a virtual reference junction (parasitic thermocouple) between the second pair of thermowires. As explained above, it can namely come to a thermowire deterioration, which leads to a parasitic thermovoltage. On the other hand, the parasitic thermovoltage can be brought about by chemical and/or physical properties, thus especially reversible effects, of the ceramic material in the case of rising temperature.

In an additional form of embodiment of the measuring arrangement, the first pair of thermowires forms a first measurement channel, and the second pair of thermowires forms a second measurement channel, and the evaluating circuit is connectable with the first and/or second measurement channel. The evaluating circuit can, thus, be designed in such a manner that it serves for registering and/or processing the measurement signals tapped via the first and via the second measurement channels.

In an additional form of embodiment of the measuring arrangement, the evaluating circuit serves to register as measurement signal a voltage fraction of the second thermovoltage corresponding to temperature.

In an additional form of embodiment of the measuring arrangement, the evaluating circuit serves to ascertain an electrical resistance of the second pair of thermowires. In such case, of concern can be the insulating resistance between the two thermowires of the first pair of thermowires.

In an additional form of embodiment of the measuring arrangement, the evaluating circuit serves to register an electrical resistance of the first pair of thermowires. In such case, of concern can be the line resistance either of the first and/or of the second thermowire of the first pair of thermowires.

In an additional form of embodiment of the measuring arrangement, the evaluating circuit serves, furthermore, to register event referenced or corresponding to a time specification, for example, recurringly, the second thermovoltage and the electrical resistance of the second pair and the electrical resistance of the first pair of thermowires. For example, the determining of the second thermovoltage can occur, especially by means of the evaluating circuit, when no measured value of the temperature is required, such as, for example, in the case of a batch process. The determining of the first thermovoltage can also occur on a predetermined schedule, for example, once every 24 hours. The determining can also occur, for example, in a certain measuring range, for example, when the second thermovoltage is at a temperature of over 300°, 600° or 1200° C.

In an additional form of embodiment of the measuring arrangement, the evaluating circuit serves, furthermore, to compare values, preferably values ascertained during operation of the measuring arrangement, of the first thermovoltage, the electrical resistance of the first pair and/or the electrical resistance of the second pair of thermowires, with at least one furnished value. The threshold values can characterize, for example, the presence of different degrees of deterioration of the second pair of thermowires.

As regards the method, the object is achieved by a method for operating a measuring arrangement as claimed in one of the preceding claims, wherein a first thermovoltage, especially a parasitic thermovoltage, is registered by means of the first pair of thermowires, for example, as reference voltage for a second thermovoltage. The second thermovoltage can, in such case, be ascertained, for example, by means of a second pair of thermowires. It is also an option to provide a circuit, which serves, on the one hand, to connect the first pair of thermowires with one another at a junction, which serves as measuring point, and, on the other hand, to interrupt this connection, so that the two thermowires of the first pair of thermowires are then electrically insulated from one another by an insulation.

In an additional form of embodiment of the method, a second pair of thermowires is provided, and a second thermovoltage is registered by means of the second pair of thermowires, which second pair of thermowires is connected electrically with one another at a junction.

In an additional form of embodiment of the method, the first thermovoltage, especially a parasitic thermovoltage, and/or the second thermovoltage are/is registered by means an evaluating circuit. In the case of the tapping of the voltage between the first pair of thermowires, essentially only the parasitic thermovoltage, or the insulating resistance, between the first pair of thermowires is registered. In the case of the tapping between the two thermowires of the second pair of thermowires, both the actual thermovoltage and also the parasitic thermovoltage superimposed on the actual thermovoltage are registered.

In an additional form of embodiment of the method, a diagnostic report is created as regards the state of the second pair of thermowires based on the first thermovoltage, especially the first parasitic thermovoltage. As a function of the size of the first thermovoltage, especially the first parasitic thermovoltage, a corresponding warning can be output to a user, such as, for example, the plant operator, especially when a predetermined threshold value has been exceeded.

In an additional form of embodiment of the method, an error contained in the second thermovoltage is determined by means of the first thermovoltage, especially the first parasitic thermovoltage. Thus, the first thermovoltage or a measurement signal derived therefrom, or a measured value derived therefrom, can be corrected.

In an additional form of embodiment of the method, the error is used for correction of a measurement signal determined based on the second thermovoltage, which error results especially from the presence of a virtual reference junction (parasitic thermocouple) between the thermowires of the second pair of thermowires.

BRIEF DESCRIPTION OF THE DRAWINGS

The invention will now be explained in greater detail based on the appended drawing, the figures of which show as follows:

FIG. 2b is a schematic circuit diagram of the thermocouple of FIG. 2a;

FIG. 3b is an equivalent circuit diagram of the thermocouple of FIG. 3a;

DETAILED DISCUSSION IN CONJUNCTION WITH THE DRAWINGS

Figure 1:
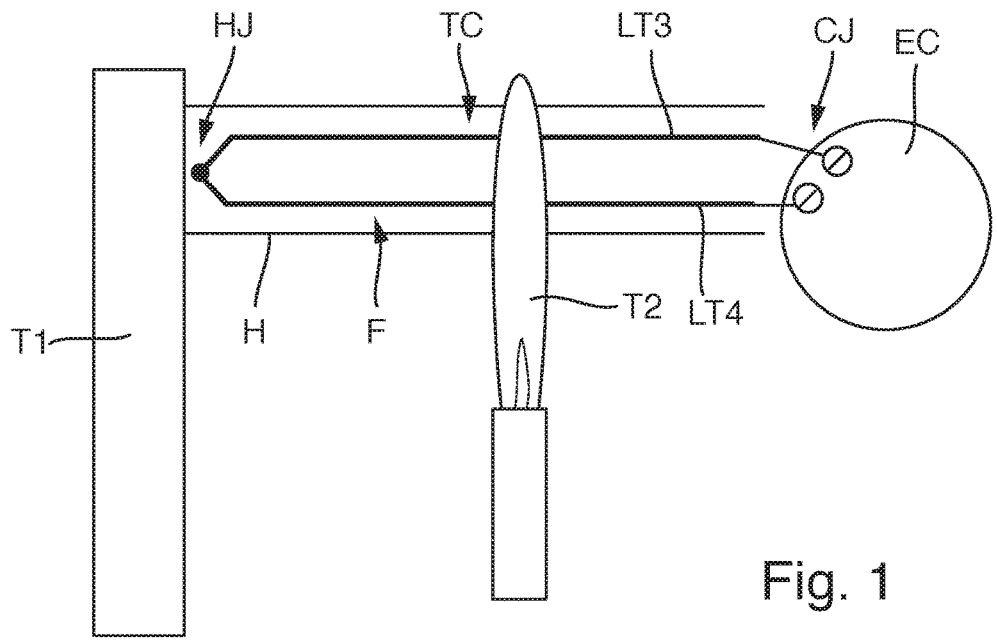
FIG. 1 is a schematic representation of a measuring arrangement, such as, for example, installed in a kiln, in the case of which, for example, heating chamber and combustion chamber are isolated from one another.

FIG. 1 shows a thermocouple TC having first and second thermowires LT3, LT4. The two wires LT3, LT4 are galvanically connected with one another, for example soldered or brazed, at one of their ends to form the so-called junction (hot junction) HJ. The junction HJ does not, in such case, absolutely have to lie at one of the ends of the thermowires LT3, LT4. Junction HJ forms at the same time the measuring point, where the temperature T1 is to be registered. Additionally, the junction HJ does not have to lie at one end of a shell S serving as measuring insert, in which the thermowires LT3, LT4 are arranged. The junction HJ can be arranged at any location along the length of the shell S.

At the end of the shell S lying opposite the junction HJ, the thermowires LT3, LT4 are connected, for example, via connection terminals, with an evaluating circuit EC, which at the same time forms the reference junction (cold junction) CJ. If a temperature difference exists between the junction HJ and the reference junction CJ, then there results at the reference junction CJ a thermovoltage, which can be measured by means the evaluating circuit EC. The evaluating circuit EC is preferably a temperature transmitter.

Present, by way of example, is the surface of a container B, in which a measured material is located. Known, however, are also other applications, such as, for example, a protective tube, which protrudes inwardly into the container B containing the measured material. In such case, the measuring insert is inserted into the protective tube and comes in contact with its floor.

Thermowires LT3, LT4 are arranged in this case in the shell S, which is filled with an insulation F, such as, for example, a mineral insulation, such as, for example, MgO or $Al_2O_3$. For example, of concern can be a mineral insulated cable.

Especially in the case of heating chambers, it can happen that the thermowires LT3, LT4 in the distance between the evaluating circuit EC, i.e. the reference junction CJ, and the junction HJ, which serves as measuring point, are, in given cases, exposed to higher temperatures T2 than at the measuring point T1. This can be true, for example, in the case of a kiln having a heating chamber separated from a combustion chamber. The temperature T2 increased relative to the measuring point is shown symbolically by the flame pictured in FIG. 1. In such a situation, a higher thermovoltage and, thus, a higher temperature is measured than is actually present at the measuring point. A goal of the present invention is to avoid this error and provide a more exact measuring of the temperature T1 by means of a thermocouple TC. Additionally, the proposed invention can provide a diagnosis of a thermocouple TC for evaluating the reliability of the measuring and the probability of failure of the thermocouple TC, i.e. of the thermowires LT3, LT4 utilized therefor.

Figure 2A:
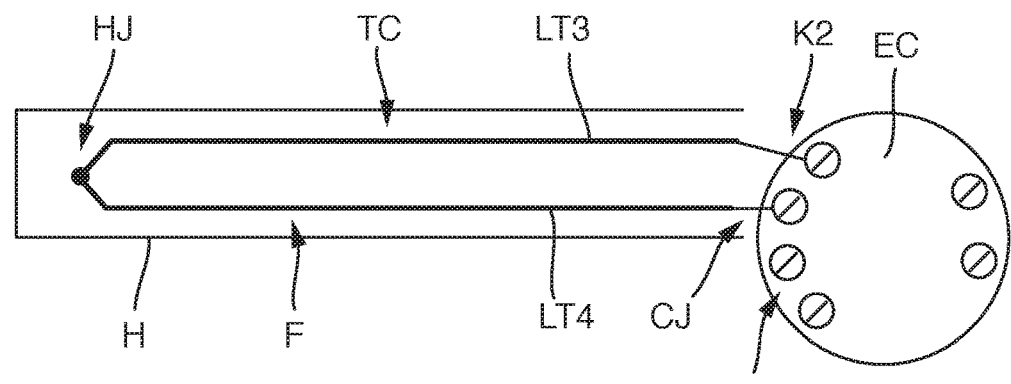
FIG. 2a is a schematic representation of a thermocouple having a junction, via which the thermocouple forms a closed line.
Figure 2B:
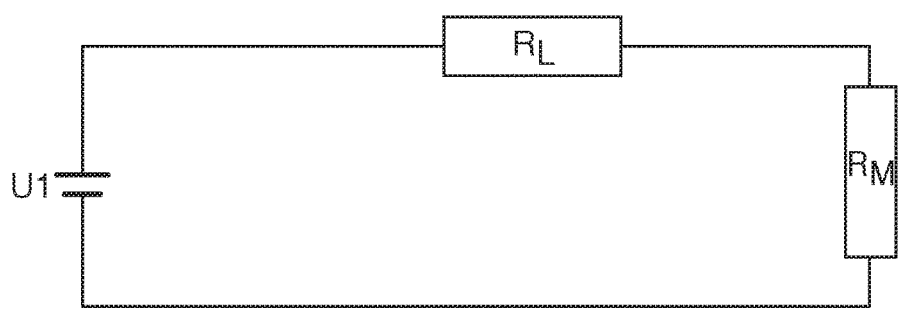

FIG. 2a shows a measuring insert, which is connected with an evaluating circuit EC and includes a thermocouple TC such as described in connection with FIG. 1. The measuring insert includes, in such case, the two thermowires LT3, LT4, a shell S and an insulation F, which, at least partially, fills the shell S. The thermowires LT3, LT4 are embedded in the insulation F. FIG. 2b shows an equivalent circuit diagram of the measuring arrangement of FIG. 2a. Due to the temperature difference between the junction HJ of the thermowires LT3, LT4 and the reference junction CJ, a thermovoltage U1 results. It is, in such case, assumed that the thermovoltage U1 arises due to the temperature difference between the temperature at the junction HJ, which is arranged at the tip of the shell S, and the temperature at the reference junction CJ.

Furthermore, the equivalent circuit diagram contains the line resistance $R_L$ of the thermowires LT3, LT4 and the internal- or measuring resistance $R_M$ of the evaluating circuit EC. Line resistance $R_{INS}$ and internal resistance $R_M$ are, in such case, arranged in series with the thermovoltage U1 illustrated as voltage source.

Figure 3A:
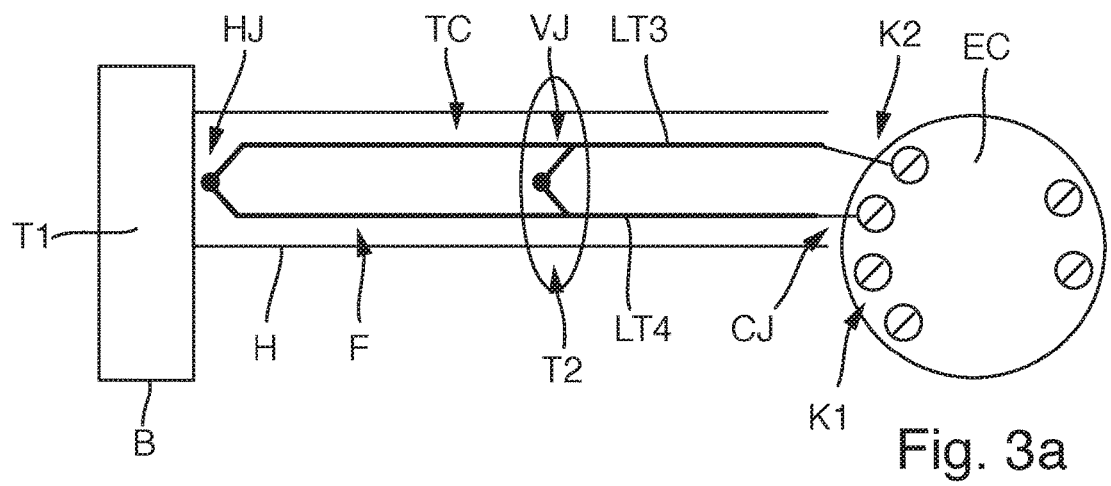
FIG. 3a is a schematic representation of a thermocouple having a junction and a virtual reference junction, by which a parasitic thermovoltage is introduced.
Figure 4:
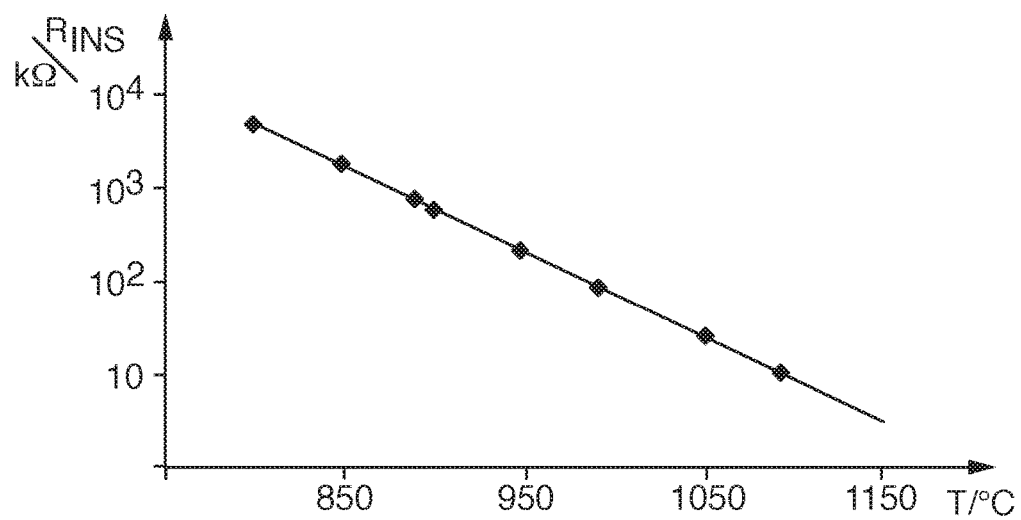
FIG. 4 is a schematic representation of the insulation resistance of a mineral insulated, sheathed cable as a function of temperature.

FIG. 3a shows a conducting connection between the thermowires LT3, LT4 brought about as a result of the temperature difference between the junction HJ and the reference junction CJ. This results, such as above explained, from the fact that the thermowires LT3, LT4, in given cases, including shell S, in which they are arranged, are led a certain distance from the reference junction CJ or evaluating circuit EC to the measuring point through an installation, such as, for example, an industrial plant. As a result of an increased temperature T2 present at a location of the installation, the insulation resistance $R_{INS}$ of the insulation F between the thermowires LT3, LT4 sinks, in given cases, so strongly that an additional conducting connection arises between the thermowires LT3, LT4 at the location of the increased temperature T2. This is also referred to as a virtual junction VJ. In such case, the resistance $R_{INS}$ of the material used as insulation F sinks, for example, from some giga-ohm by about one power of ten per 100° temperature difference, such as shown in FIG. 4. A corresponding behavior results in the case of other known materials used for the insulation of thermowires LT3, LT4, such as glass or $Al_2O_3$. The influence of the sinking insulation resistance $R_{INS}$ and therewith the meaning of a parasitic thermovoltage U2 resulting therefrom on the measurement signal registered by means of the evaluating circuit EC, such as, for example, a transmitter, can, however, be determined by means of the thermowires LT1, LT2.

Figure 5:
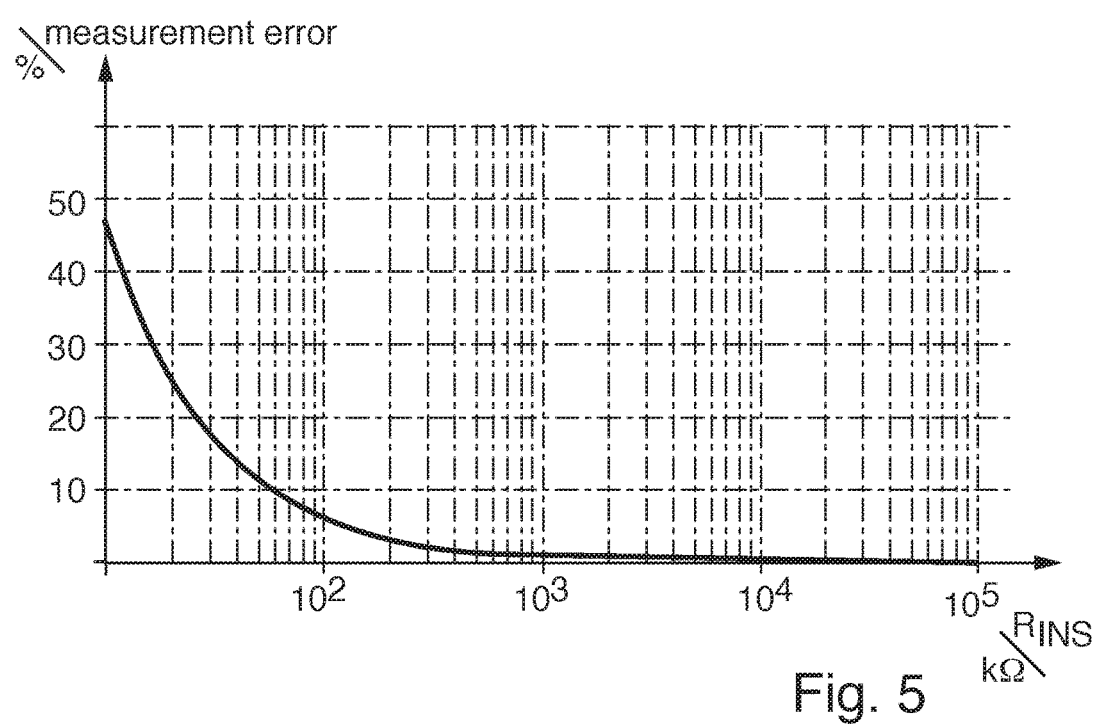
FIG. 5 is a schematic representation of the measurement error in the thermovoltage as a function of the insulation resistance.

The measurement error resulting from the parasitic thermovoltage U2 in % is shown in FIG. 5 as a function of the insulation resistance between the thermowires. In the case of small insulation resistance $R_{INS}$ of the insulation between the thermowires LT3, LT4, thus, a correspondingly high measurement error results. In the case of an insulation resistance $R_{INS}$ of 30 ohm, there results, accordingly, a measurement error of 20%. By means of a suitable insulation resistance $R_{INS}$, this error can be minimized and when correspondingly higher insulation resistances are achieved by suitable materials. For such purpose, suitable materials, such as, for example, boron nitride or beryllium oxide are, however, either very expensive or toxic.

Figure 3B:
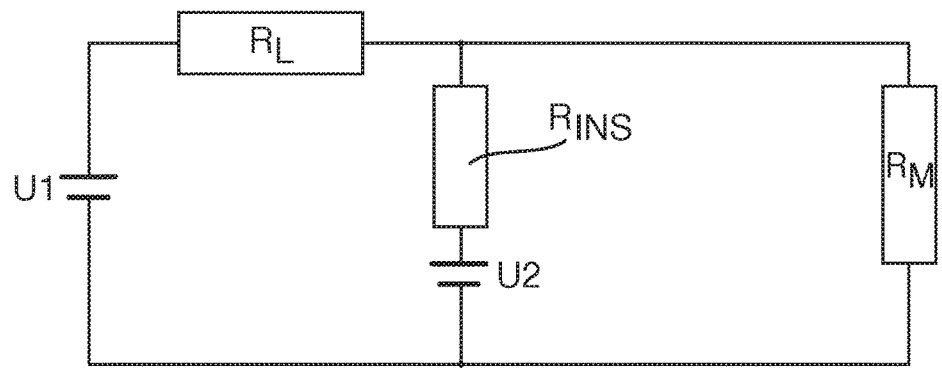

FIG. 3b shows an equivalent circuit diagram of the measuring arrangement of FIG. 3a. The virtual reference junction VJ is composed, in such case, of the insulation resistance $R_{INS}$ and the parasitic thermovoltage U2. The insulation resistance $R_{INS}$ is arranged in parallel with the measuring resistance $R_M$, while the parasitic voltage U2 shown in the equivalent circuit diagram as a voltage source is arranged in parallel with the actual measurement voltage U1, likewise shown as a voltage source.

Figure 6A:
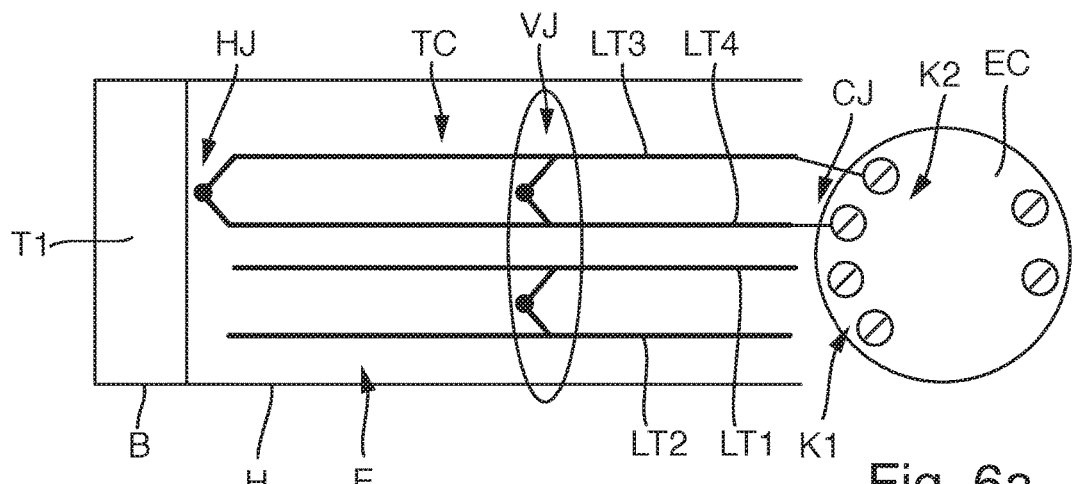
FIG. 6a is a schematic representation of first and second pairs of thermowires in the case of which a parasitic thermovoltage is present due to a virtual reference junction.
Figure 6B:
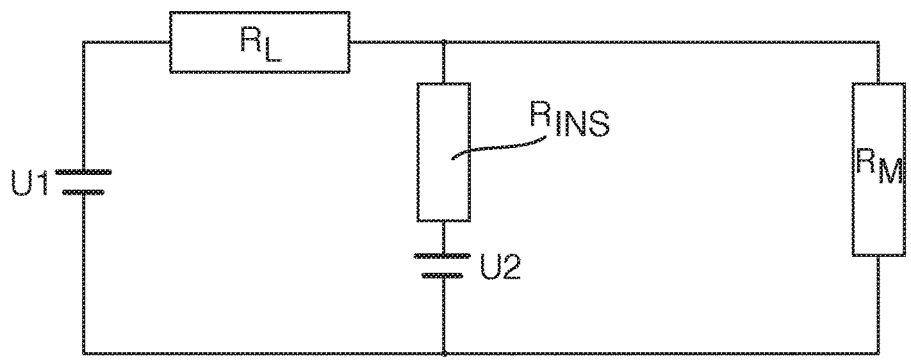
FIG. 6b is an equivalent circuit diagram of the second pair of thermowires of FIG. 6a, which have a junction.
Figure 6C:
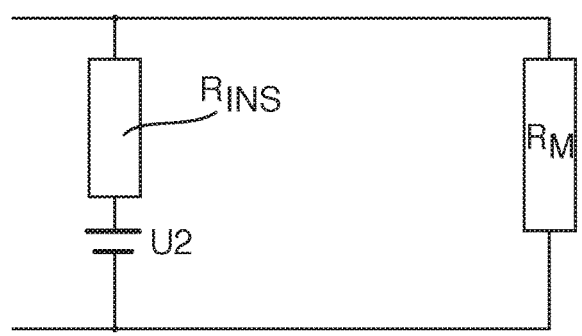
FIG. 6c is an equivalent circuit diagram of the first pair of thermowires of FIG. 6a, which has no junction.

FIG. 6a shows an arrangement of thermowires LT1, LT2, LT3, LT4, by which a deterioration of the thermowires LT3, LT4 and/or a sinking insulation resistance $R_{INS}$ between the thermowires LT3, LT4 can be compensated.

In such case, a mineral insulated line is used, in which e.g. two type K thermocouples are embedded, wherein, however, a junction HJ is formed only between one pair of thermowires LT3, LT4. An arising measurement error can then be compensated by calculation by means of a temperature transmitter EC, with which the thermowires LT3, LT4 are connected.

A first pair of thermowires LT1, LT2, which are not connected with one another, forms, in such case, an open line. This first pair LT1, LT2 forms, in given cases, a parasitic thermocouple VJ.

A second pair of thermowires LT3, LT4, which are connected with one another at a junction HJ, forms, in such case, a closed line. In this closed line, there forms besides the measuring thermocouple, in given cases, also the parasitic thermocouple VJ. Instead of the here shown four thermowires LT1, LT2, LT3, LT4, an arrangement of the invention can also be composed of only a single pair of thermowires LT1, LT2, which are not connected with one another. Likewise, an embodiment with only three thermowires is possible wherein two of these thermowires form the first pair LT1, LT3 and two the thermowires LT3, LT4 of the second pair.

The thermowires LT1, LT2, which form the first pair, are, in the region in which they are arranged in the shell S, completely insulated from one another by an insulation F. In the illustrated case, the first and second pairs of thermowires LT1, LT2, LT3, LT4 extend along the total length of the shell S spaced from one another in the shell S.

The temperature transmitter EC can have different inputs K1, K2 and, for measurement signal processing, for example, switch between these inputs, also referred to as channels. In such case, a first input K1 can be connected with the first pair LT1, LT2 and a second input K2 with the second pair of thermowires LT3, LT4. By means of the transmitter EC, a resistance measurement and/or a voltage measurement can occur between the thermowires LT1, LT2, and LT3, LT4, connected to the respective inputs K1, K2. The inputs K1, K2 of the transmitter EC can especially be alternately sampled. This can occur corresponding to a predetermined schedule, which is furnished, for example, in software of the transmitter EC.

At the second input K2 of the transmitter, which forms a second measurement channel, the total voltage between the second pair of thermowires LT3, LT4 and/or the line resistance $R_L$ of the closed line can be measured. The resistance $R_L$ of the closed line can, in such case, be determined with a first polarity and then with reverse polarity and then averaged.

At the first input K1 of the transmitter, which forms a first measurement channel, the insulation resistance $R_{INS}$ between the first pair of thermowires LT1, LT2 can be measured. When this falls below a predetermined threshold value, for example, 1000 ohm, either a corresponding report can be output and/or a compensation of the measurement signal or of the measured value, as determined by means of the second pair of thermocouples LT3, LT4, performed.

If the predetermined threshold value is achieved or exceeded, the influence of the parasitic thermovoltage U2 can be compensated, for example, based on the measured insulation resistance $R_{INS}$. For determining the insulation resistance $R_{INS}$, for example, electrical current and voltage across the open line can be cyclically measured.

Since the input resistance $R_M$ of the temperature transmitter is known, the resistances $R_L$, $R_{INS}$ and the voltage $U_2$ can be determined. From these variables, then the voltage U1 caused by the junction between the second pair of thermowires LT3, LT4 and, thus, the temperature T1 at the measuring point can be determined.

Thus, in a first operating mode of the temperature transmitter EC, the influence of the parasitic thermovoltage U2 can be compensated. Furthermore, a second operating mode of the transmitter EC can be provided, in which the parasitic thermovoltage U2 is monitored, without a compensation of the measuring occurring. In a third operating mode, a measuring of the thermovoltage of the second pair of thermowires LT3, LT4 occurs, without measuring resistance, electrical current and/or voltage on the open line LT1, LT2.

In the first operating mode, the transmitter EC can determine on the first channel K1 the insulation resistance $R_{INS}$ and the parasitic voltage U2. In such case, the first channel K1 can be used once as measurement channel for resistance measurement $R_{INS}$ and once for registering the parasitic thermovoltage U2.

Via the second channel K2, a measuring of the line resistance $R_L$ and the voltage $U_3$ falling across the internal resistance $R_M$ of the transmitter EC can be registered. From the measured variables, the voltage $U_1$ arising from the junction HJ between the second pair of thermowires LT3, LT4 can be calculated as follows:

$$U_1=U_3(1+R_L/R_M)-R_L(U_2-U_3)/R_{INS}$$

The sinking of the insulation resistance depends, however, not only on the instantaneous value of the temperature but on the length of time, over which a temperature acts on the thermowires LT1, LT2, LT3, LT4, and on the insulation F. The measuring and registering of the insulation resistance $R_{INS}$ of the line resistance enables, thus, a performing of a diagnosis of the thermowires, for example, of the second pair of thermowires LT3, LT4, and the outputting of a report characterizing the state of the thermowires LT3, LT4.

Experiments have additionally shown that the parasitic voltage U2 can even increase above the value of the thermovoltage actually expected at this temperature. This is an indication that chemical conversion of the mineral insulated line or generally a deterioration of the thermowires LT1, LT2, LT3, LT4 is happening. Such conversion likewise limits the durability of the used thermowires LT1, LT2, LT3, LT4. Thus, the insulation between the thermowires LT1, LT2, LT3, LT4 becomes increasingly conductive and begins to behave similarly to an electrolyte in a battery. This can then lead to dissolution of the material of the thermowires LT1, LT2, LT3, LT4. The evaluation of the parasitic voltage U2 measured by means of the first pair of thermowires LT1, LT2 can, thus, be utilized, in order to determine the state of the used thermowires, especially their (remaining) life.

The parasitic thermovoltage U2 is shown in FIG. 3a and FIG. 6a as an additional connection between the thermowires LT1, LT2, LT3, LT4, which connection lies between the junction HJ and the reference junction CJ—this is indicated by an oval, in which a connection between the first pair of thermowires LT1, LT2, respectively the second pair of thermowires LT3, LT4, is located.

The first and second pairs of thermowires LT1, LT2, LT3, LT4 can be embedded in a material, which serves as insulation F. As a result of this insulation F, both the first pair of thermowires LT1, LT2 as well as also the second pair of thermowires LT3, LT4 are completely insulated from one another (at least in the region, in which they are embedded in the insulation). Insulation F thus not only insulates the individual thermowires of a pair LT1, LT2 but also the pairs from one another. It is, however, also possible for practicing the invention to use only one pair of thermowires LT1, LT2, which are completely insulated from one another.

The first and second pairs LT1, LT2, LT3, LT4 are, in such case, preferably arranged, such as shown, for example, in FIG. 6a, in one and the same shall S, which is at least partially filled with the insulation F. The first and second pairs LT1, LT2, LT3, LT4 extend, in such case, preferably parallel to one another in the region, in which they are arranged in the shell. The shell can have one end closed, for example, by a floor especially in the form of a cap. Furthermore, the shell S can have an open end, through which the thermowires LT1, LT2, and LT3, LT4, preferably the free ends of the thermowires LT1, LT2, and LT3, LT4 or connection lines (not shown) connected to the thermowires are led.

The invention claimed is:

1. A measuring arrangement, comprising:
a first pair of thermowires,
a second pair of thermowires, and
an evaluating circuit, wherein:
a first thermowire and a second thermowire of said first pair are insulated completely from one another by an insulation,
said two thermowires of said first pair have no junction for determining temperature and electrically connecting said two thermowires of said first pair with one another,
said two thermowires of said first pair serve to register a first thermovoltage,
said two thermowires of said second pair are electrically connected with one another at a junction and serve to provide a second thermovoltage,
said first pair of thermowires is electrically insulated from said second pair of thermowires, and
said evaluating circuit serves to register said first thermovoltage and said the second thermovoltage.

2. The arrangement as claimed in claim 1, wherein:
said second pair of thermowires extends along a path; and
said first pair of thermowires extends along at least one part of said path.

3. The arrangement as claimed in claim 1, wherein:
said first and/or said second pair of thermowires are embedded at least partially in an electrically insulating material.

4. The arrangement as claimed in claim 3, wherein:
said insulating material is surrounded by a shell.

5. The arrangement as claimed in claim 4, wherein:
said shell is arranged in a protective tube.

6. The arrangement as claimed in claim 1, wherein:
at least three thermowires are provided; and
a first and a second of said three thermowires form said first pair; and
said first and a third of said three thermowires form said second pair.

7. The arrangement as claimed in claim 1, wherein:
four thermowires are provided, and a first and a second of said four thermowires form said first pair; and
a third and a fourth of said four wires form said second pair.

8. The arrangement as claimed in claim 1, wherein:
said first thermovoltage serves to produce a diagnostic report regarding a state of said second pair of thermowires or a state of a measurement signal.

9. The arrangement as claimed in claim 1, wherein:
said first thermovoltage serves for correction of an error contained in said second thermovoltage.

10. The arrangement as claimed in claim 1, wherein:
said first pair of thermowires forms a first measurement channel; and
said second pair of thermowires forms a second measurement channel; and said evaluating circuit is connectable with said first and/or second measurement channel.

11. The arrangement as claimed in claim 1, wherein:
said evaluating circuit serves to register as measurement signal a voltage fraction of said second thermovoltage corresponding to a temperature.

12. The arrangement as claimed in claim 1, wherein:
said evaluating circuit serves to ascertain an electrical resistance of said second pair of thermowires.

13. The arrangement as claimed in claim 1, wherein:
said evaluating circuit serves to register an electrical resistance of said first pair of thermowires.

14. The arrangement as claimed in claim 1, wherein:
said evaluating circuit serves to register said second thermovoltage and the electrical resistance of said second pair and the electrical resistance of said first pair of thermowires upon an occurrence of a referenced event or specified time.

15. The arrangement as claimed in claim 1, wherein:
said evaluating circuit serves to compare said ascertained values of said second thermovoltage, said electrical resistance of said second pair and said electrical resistance of said first pair of thermowires, with at least one furnished value.

16. The measuring arrangement as claimed in claim 1, wherein:
said first and a second thermowire of said first pair are insulated completely from one another by an insulation in the form of a material, which serves for electrical insulation between the two thermowires of the first pair.

17. The measuring arrangement as claimed in claim 1, wherein:
said two thermowires of said first pair have free ends.

18. The measuring arrangement as claimed in claim 1, wherein:
said first thermovoltage is a parasitic thermovoltage, or
said first thermovoltage is a reference voltage for said second thermovoltage.

19. A method for operating a measuring arrangement, the measuring arrangement comprising:
a first pair of thermowires,
a second pair of thermowires, and
an evaluating circuit, wherein:
the two thermowires of said first pair are insulated completely from one another by an insulation,
said two thermowires of said first pair have no junction for determining temperature and electrically connecting said two thermowires of said first pair with one another,
said two thermowires of said first pair serve to register a first thermovoltage,
said two thermowires of said second pair are electrically connected with one another at a junction and serve to provide a second thermovoltage, and
said first pair of thermowires is electrically insulated from said second pair of thermowires,
the method comprising the steps of:
registering a first thermovoltage by means of said first pair of thermowires.

20. The method as claimed in claim 19, wherein:
a second thermovoltage is registered by means of said second pair of thermowires, which are electrically connected with one another at a junction.

21. The method as claimed in claim 20, wherein:
said first thermovoltage and/or said second thermovoltage are/is registered by means of said evaluating circuit.

22. The method as claimed in claim 20, wherein:
a diagnostic report is ascertained as regards a state of said second pair of thermowires based on said first thermovoltage.

23. The method as claimed in claim 20, wherein:
an error contained in said second thermovoltage is determined by means of said first thermovoltage.

24. The method as claimed in claim 23, wherein:
said error is used for correction of a measurement signal determined based on said second thermovoltage.

* * * * *